Sept. 10, 1929.　　J. H. NICKS ET AL　　1,727,666
RAT AND MOUSE TRAP

Filed May 2, 1928

Inventor

John H. Nicks
Richard S. Crain
By Lacey & Lacey, Attorneys

UNITED STATES PATENT OFFICE.

JOHN H. NICKS AND RICHARD S. CRAIN, OF SAN SABA, TEXAS.

RAT AND MOUSE TRAP.

Application filed May 2, 1928. Serial No. 274,559.

This invention provides a trap for ridding dwellings of rodents and which is self and ever set, thereby requiring but little attention, such as necessary to supply bait, remove the ensnared animals and maintain the device in a sanitary condition.

The invention relates to a trap for catching rats and mice and including a pivoted platform which tilts under the weight of the animal to precipitate it into a chamber from which escape is guarded against.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which, Figure 1 is a perspective view of an animal trap embodying the invention.

Figure 2 is a vertical, central, longitudinal sectional view of the trap.

Figure 3 is a transverse sectional view on the lines 3—3 of Figure 2.

Corresponding and like parts are referred to in the following description and designated in the several views of the drawing by like reference characters.

The body of the trap includes a chamber 1 which holds the ensnared animals, said body being open at the top and closed at its bottom, ends and sides. An opening is formed in an end of the body for removal of the animals, and to admit of ready access to the chamber for sanitary or other purposes. A tilting platform 2 is located at each end of the body and is pivoted to the sides thereof at an intermediate point. A cover 3 is located between each end of the trap and the axes 4 of the tilting platforms. The platforms 2 tilt so that their inner ends swing downward to discharge the animals into the chamber 1. The cover 3 forms a guard to prevent the escape of any animal previously ensnared. The inner ends of the platforms 2 are spaced apart, and a roller 5 is located in this space and serves to obstruct the passage of an animal and to prevent its backward movement when the platform begins to tilt. The natural tendency of the animal is to spring forward, and the roller 5 turning acts jointly with the tilting of the platform to precipitate the animal into the chamber 1.

The outer portion of the platform 2 is heavier than the inner portion, hence when the platform is relieved of the weight of the animal it quickly assumes a normal position, with the result that the trap is self setting and ever set. The roller, guards and platforms are located at the top of the body so as to normally close the top thereof. A sliding door 6 closes the opening in the end of the trap.

A cover 7 is detachably fitted to the upper portion of the body and includes a top and sides. Ears 8 depend from the sides of the cover 7 and coact with keepers 9 at the sides of the body to retain the cover in place. An opening is formed in the top of the cover opposite the roller 5, and is closed by a sliding door 10. A bait box 11 is located upon the bottom side of the cover 7 opposite the opening therein and in line with the roller 5, and coacts with said roller to prevent direct passage of the animal through the space formed between the top of the cover 7 and the top of the body. The tilting of the platforms 2 is limited by the cover as will be readily appreciated.

A runway 12 is located at each end of the trap to facilitate entrance to the space formed between the cover 7 and the top of the body. A bail 13 connects each of the runways with the sides of the cover, hence the cover and runways may be easily and quickly removed and replaced.

The arrangement is such as to admit of the runways 12 folding into the space formed between the cover and the top of the body as will be readily understood.

When the trap is set it appears substantially as indicated in Figure 2 of the drawings, it being understood that suitable bait is supplied to the box 11 which is preferably formed of wire fabric. An animal mounting either one of the runways 12 and entering the space formed between the cover 7 and top of the body moves over the adjacent platform 2 which tilts when a preponderance of weight occurs forwardly of the axis 4. As the platform tilts its inner end moves downwardly, thereby directing the animal into the chamber 1 and any attempt of the animal to obtain a purchase upon the roller 5 is frustrated by said roller turning and acting jointly with the platform to precipitate the animal into the chamber 1. When the animal has thus been entrapped escape is prevented and the platform quickly assumes a normal position to tilt under the weight of the next animal, escape of the previously ensnared animal being prevented in the manner indicated.

The trap may be located in any place since the cover 7 prevents interference with its operation and insures proper entry of the animal to its ensnaring.

Having thus described the invention, we claim:

1. An animal trap comprising a body including a chamber, pivoted platforms extending over the chamber and spaced at their inner ends, and a freely rotatable roller closing the space formed between the inner ends of the platforms to act jointly therewith to precipitate the animal into the chamber.

2. An animal trap comprising a body enclosing a chamber, tilting platforms at opposite ends of the body and spaced apart at their inner ends, a freely rotatable roller disposed between the inner ends of the platforms, a cover detachably fitted to the body and having an opening in its top in line with the said roller, a bait box applied to the bottom side of the cover in line with the opening therein, runways and bails pivotally connecting the runways to the cover, and admitting of the runways folding into the space formed between the cover and the top of the body.

In testimony whereof we affix our signatures.

JOHN H. NICKS. [L. S.]
RICHARD S. CRAIN. [L. S.]